(12) United States Patent
Calcaterra et al.

(10) Patent No.: US 8,132,675 B2
(45) Date of Patent: Mar. 13, 2012

(54) FILTER HAVING BASEPLATE WITH INTERNAL GASKET LOCATION

(75) Inventors: Farrell F. Calcaterra, Kearney, NE (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 459 days.

(21) Appl. No.: 11/950,472

(22) Filed: Dec. 5, 2007

(65) Prior Publication Data
US 2009/0145826 A1   Jun. 11, 2009

(51) Int. Cl.
*B01D 27/00* (2006.01)
*B01D 35/28* (2006.01)
*B01D 35/30* (2006.01)
*B01D 35/00* (2006.01)

(52) U.S. Cl. ......... 210/450; 210/440; 210/443; 210/455

(58) Field of Classification Search .................. 210/440, 210/450, 443, 455, DIG. 17
See application file for complete search history.

(56) References Cited

U.S. PATENT DOCUMENTS

| | | | |
|---|---|---|---|
| 3,067,880 A * | 12/1962 | Bowers et al. | 210/249 |
| 3,200,953 A * | 8/1965 | Komarmy | 210/457 |
| 3,508,658 A * | 4/1970 | McVay | 210/114 |
| 4,668,393 A | 5/1987 | Stone | |
| 4,692,245 A | 9/1987 | Church et al. | |
| 4,740,299 A | 4/1988 | Popoff et al. | |
| 4,997,555 A | 3/1991 | Church et al. | |
| 5,244,571 A | 9/1993 | Church et al. | |
| 5,362,389 A | 11/1994 | Hardison et al. | |
| 5,362,392 A | 11/1994 | Jensen | |
| 5,547,572 A | 8/1996 | Stone | |
| 5,573,666 A * | 11/1996 | Korin | 210/232 |
| 5,622,623 A | 4/1997 | Stone | |
| 5,643,446 A | 7/1997 | Clausen et al. | |
| 5,645,718 A | 7/1997 | Hardison et al. | |
| 5,770,065 A | 6/1998 | Popoff et al. | |
| 5,904,844 A | 5/1999 | Stone | |
| 6,015,492 A | 1/2000 | Popoff et al. | |
| 6,053,334 A | 4/2000 | Popoff et al. | |
| 6,113,781 A | 9/2000 | Popoff et al. | |
| 6,139,738 A | 10/2000 | Maxwell | |
| 6,171,491 B1 | 1/2001 | Popoff et al. | |
| D441,422 S | 5/2001 | Jensen | |
| 6,328,883 B1 | 12/2001 | Jensen | |
| 6,571,961 B2 * | 6/2003 | Demirdogen | 210/443 |
| 2008/0006573 A1 | 1/2008 | Wolf et al. | |

FOREIGN PATENT DOCUMENTS

| | | |
|---|---|---|
| DE | 20 2006 010 561 U1 | 12/2007 |
| EP | 1 484 098 A1 | 12/2004 |
| JP | 09024210 | 1/1997 |
| WO | WO 98/09703 A1 | 3/1998 |
| WO | WO 2004/051070 A1 | 6/2004 |

* cited by examiner

*Primary Examiner* — Benjamin Kurtz
(74) *Attorney, Agent, or Firm* — Reinhart Boerner Van Deuren P.C.

(57) ABSTRACT

The present disclosure pertains to a fluid filter having a gasket locator such as a cylindrical wall on the underside of the baseplate which positions and supports an internal gasket.

13 Claims, 2 Drawing Sheets

FILTER HAVING BASEPLATE WITH INTERNAL GASKET LOCATION

FIELD OF THE INVENTION

This invention generally relates to a fluid filter, and more particularly to baseplates and/or internal sealing of baseplates for fluid filters.

BACKGROUND OF THE INVENTION

Many types of filters for filtering fluids are well known in the art as is exemplified by U.S. Pat. No. 5,643,446 to Clausen et al. entitled "Fuel Filter and Priming Pump"; or U.S. Pat. No. 6,328,883 to Jensen entitled "Fuel Filter Assembly with Priming Pump." The cross section of FIG. 1 illustrates another example of another known filter. The present disclosure includes improvements over the state of the art.

BRIEF SUMMARY OF THE INVENTION

An aspect of the present invention is directed toward a gasket locator that is provided between an end cap for the filter media and the base plate of a filter cartridge. The gasket locator can position, retain and/or support an internal annular gasket in a desirable location. Preferably, the gasket locator is in the form of an annular wall that may be integrally formed and molded onto the bottom side of the base plate. A filter cartridge including this aspect includes generally cylindrical housing with a base plate secured to the housing that provides an inlet and an outlet. A ring of filter media is contained within a cavity of the housing and is arranged to filter fluid flowing between the inlet and the outlet. The gasket locator is interposed between the end cap of the internal filter element and the base plate. The gasket locator is adjacent an internal annular gasket that is also interposed between the base plate and the end cap.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
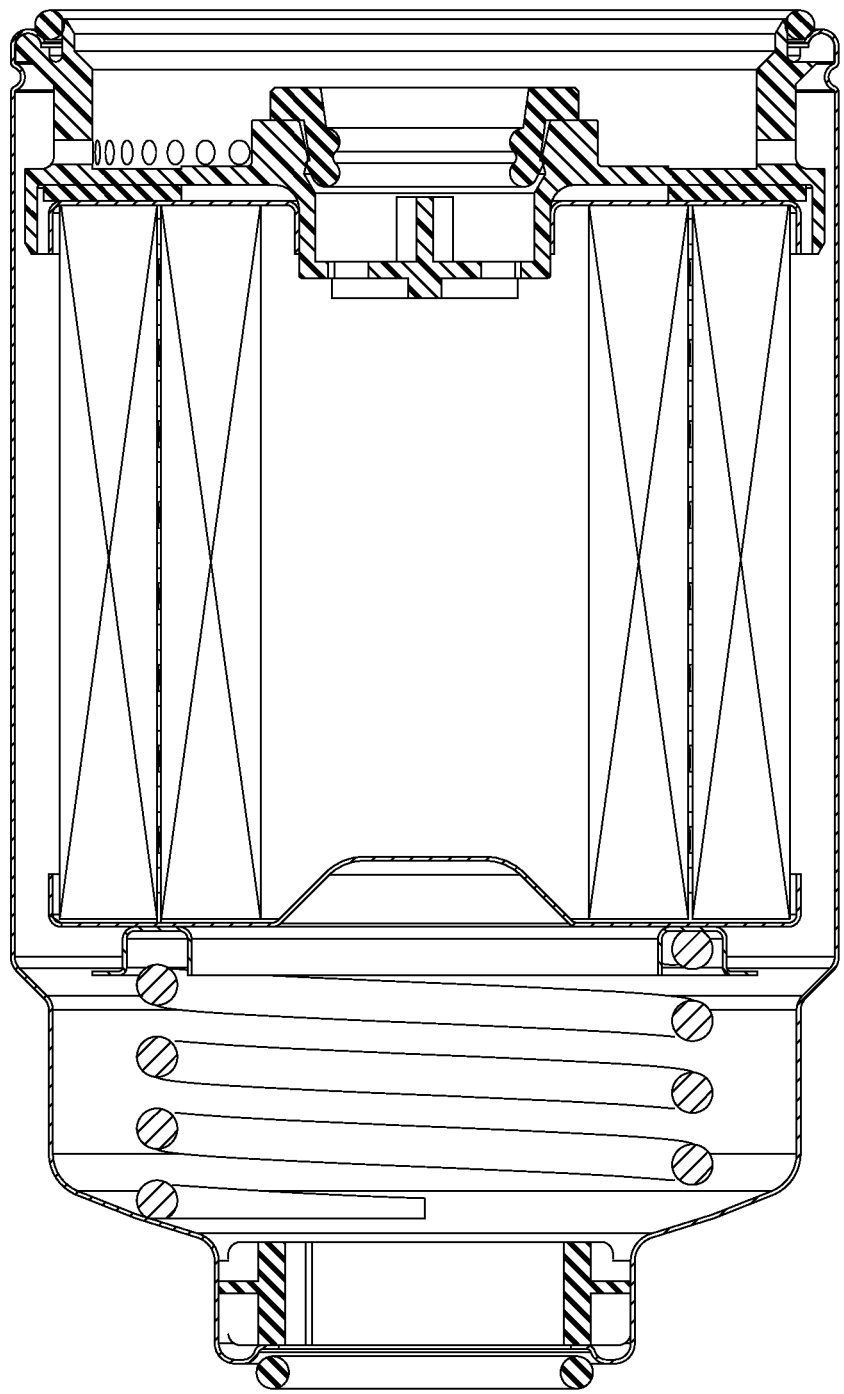
FIG. 1 is a cross section of a known fuel filter cartridge.
Figure 2:
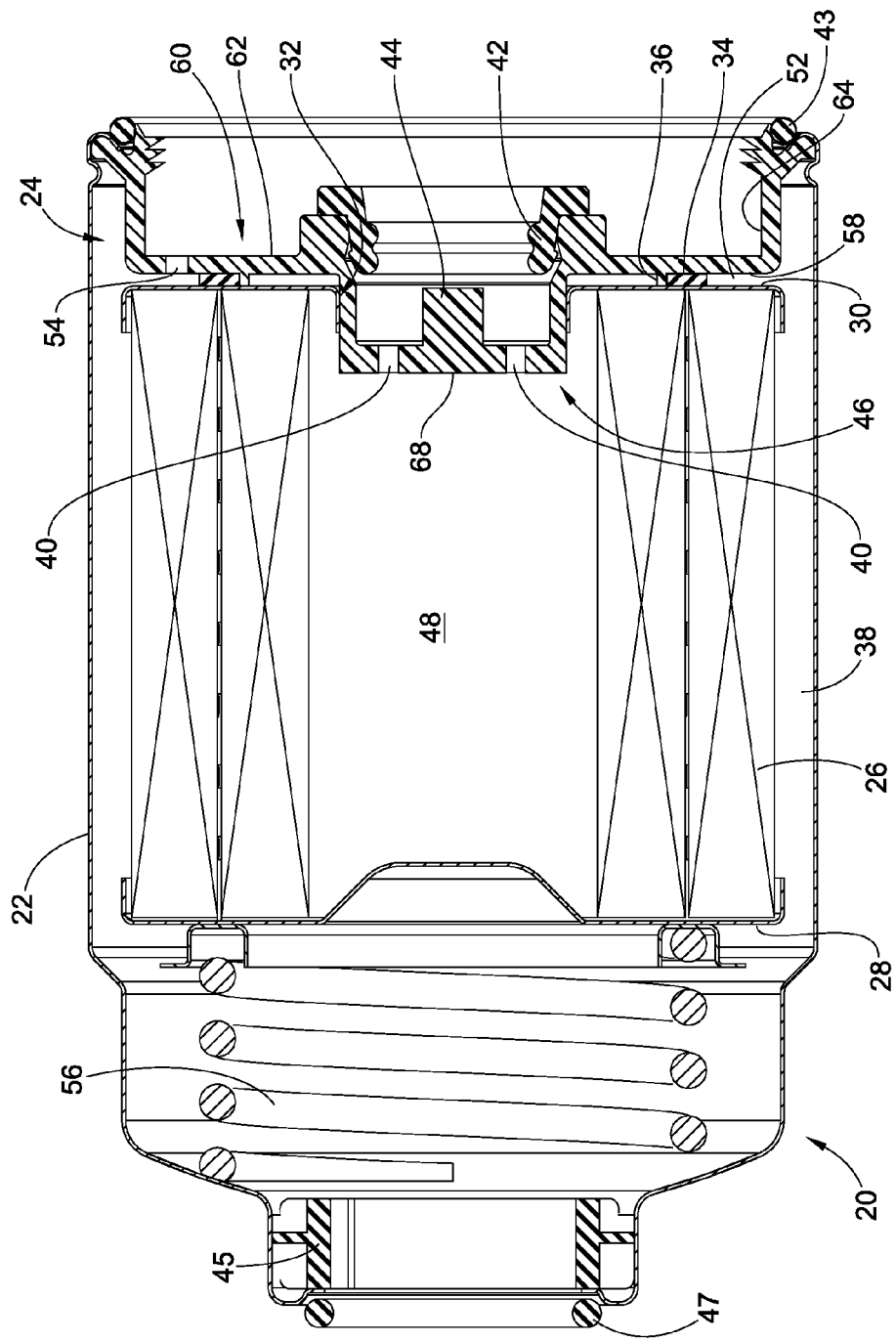
FIG. 2 is a cross section of an exemplary embodiment of a fuel filter cartridge having a gasket locator, in accordance with the teachings of the present invention.

FIG. 2 illustrates a fluid filter cartridge generally indicated at 20 in accordance with an embodiment of the present invention. The filter cartridge 20 may be used to filter out impurities from a fluid, and more particularly a liquid such as, for example without limitation, fuels, coolants, or lubricants used in or by engines. As shown, the filter cartridge 20 is in the form of a fuel filter that is adapted to filter water and impurities out of fuel along an engine fuel circuit.

The filter cartridge 20, includes a housing generally indicated at 22 and a base plate 24 attached to the housing 22. As shown, the housing can be provided by a deep drawn metal canister having opposed first and second open ends with a cylindrical wall therebetween with several stepped regions. The baseplate 24 can be secured directly to the metal canister by wrapping the terminating end of the canister over the outer periphery of the baseplate.

The housing 22 has an internal cavity and houses the filter media 26 and also shares a common longitudinal central axis with an internal filter element that includes suitable filter media 26. The internal filter element includes a bottom closed circular end cap 28 sealingly connected to one end of the filter media 26. The closed circular end cap 28 seals off an internal cavity 48 of the filter media 26 which causes fluid to flow through the filter media 26. An open top annular end cap 30 is sealingly connected at the opposite end of the filter media 26. The end caps 28, 30 may be stamped metal components that are sealingly connected to filter media 26 by known means such as potting, or may be integrally molded components, or alternatively plastic parts that are embedding the media into the end caps 28, 30 (e.g. ultrasonically). In any event, the end caps are attached to the media in a sealed manner to prevent fluid bypass between the filter media 26 and the end caps 28, 30. The annular end cap 30 provides a flat smooth surface for providing a good surface with which internal gasket 34 can form a seal.

The baseplate 24 can be a plastic molded and/or formed part to include a radially extending plate-like flange portion 60 connecting the central hub portion 46 with an outer rim 64. The baseplate 24 includes an interior surface 58 and an external surface 62. The outer rim 64 includes a threaded region to facilitate threaded attachment of the filter cartridge to a mounting adaptor of fluid circuit (not shown). The central hub portion 46 includes a plurality of outlet openings 40 for permitting fluid flow, typically clean fluid flow, from the central cavity 48 of the filter media 26 through the base plate 24. The hub portion 46 may also include a projection 44 that can provide means for actuating a valve of a mounting circuit (not shown). To facilitate inlet flow, the baseplate 24 includes inlet openings 54, which can be provided through the flange portion 60 due to the internal sealing system provided herein.

The central hub 46 of the base plate 24 is received freely and without seal interference into aperture 32 defined by the annular end cap 30. Sufficient clearance can be provided to afford easy assembly.

Rather than providing a seal along aperture 32, the internal annular gasket 34 can be spaced radially outward and axially interposed between the annular end cap 30 and the base plate 24. The gasket 34 is axially compressed between the end cap 30 and base plate portion 24 to provide a seal therebetween that prevents fluid flow between the annular end cap 30 and base plate portion 24. This prevent fluid communication between the inlet and outlet fluid streams and thereby prevents fluid from bypassing or short-circuiting the filter media 26. A coil spring 56 supported in the stepped region of the housing acts upon the filter element to bias it axially towards the base plate portion 24 and thereby compress the gasket 34.

A gasket locator 36 is axially interposed between the annular end cap 30 and the base plate 24. The gasket locator 36 radially positions gasket 34. The gasket locator 36 prevents the annular gasket from shifting radially inward and can support the gasket radially relative to a pressure differential between the outside unfiltered fuel and the inside filter fuel (e.g. due to any pressure drop caused by the filter media). The gasket locator 36 may take the form of an annular wall, which is preferably molded into a bottom side of the base plate portion 24 along the flange portion 60. While the gasket locator 36 is preferably directly integrated into the base plate 24, such structure may be provided on annular end cap 30. In the illustrated embodiment, the gasket locator 36 is integrally formed on the base plate portion 24 as a one-piece unitary component. The gasket locator 36 may be of, but would not be limited to, a groove, a channel, a stand-off portion or ribbed material. The gasket 34 can be axially thicker than the annular wall of the gasket locator 36 to facilitate axial compression according to a preferred sealing arrangement. Further, the annular wall may be sized to control the maximum amount of compression of the annular gasket and prevent overcompression of the annular gasket, the annular wall adapted to bottom out on the top end cap to prevent overcompression, whether it be due to spring and/or fluid forces.

As to other features, the baseplate 24 carries external gaskets 42 and 43 to facilitate sealing to the engine circuit when mounted thereto. Additionally, a threaded ring 45 defining a water drain port (e.g. for a collection, bowl or other), is attached to the end of the canister opposite the baseplate 24. The canister end can be wrapped over the ring 45 for securement. A gasket 47 can be provided for sealing at this end.

When mounted to the filter head (not shown), unfiltered ("or dirty") fuel enters the filter cartridge 20 through the inlet openings 54 in the base plate portion 24 to a gap 52 that is created between end cap 30 and base plate portion 24, radially outward from gasket 34. In the first fluid passage, the unfiltered fluid will flow radially outward between the annular end cap 30 and the base plate portion 24 to an outer chamber 38 formed between the filter media 26 and the housing portion 22. The fluid will then flow through the filter media 26. As the unfiltered fluid passes through the filter media 26, impurities such as water or unwanted particulates may coalesce or accumulate on the outer surface of the filter media. These impurities may flow downward because of a higher density than fuel and can be collected below the filter media 26 or in a removable collection bowl (not shown) attached at the end of the housing portion 22.

Once the fuel passes through filter media 26, the clean fuel stream then passes through a second fluid flow passage formed in part by openings 40 located in the end wall 68, located in the center projection 44 of the base plate portion 24. Grommet 42 forms a seal with an outlet pipe (not shown) of a filter head, sealing the unfiltered inlet fluid flow from the filtered outlet fluid flow, further preventing dirty fluid from bypassing the filter media 26.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cartridge comprising:
a generally cylindrical housing having a cavity;
a base plate secured to said housing, the base plate providing an inlet and an outlet;
a ring of filter media within the cavity, the filter media arranged to filter fluid flowing between the inlet and the outlet;
an end cap attached to one end of said filter media;
an annular gasket having a radially outer peripheral edge and a radially inner peripheral edge, the annular gasket interposed between said end cap and said base plate; and
a gasket locator interposed between said end cap and said base plate and adjacent said annular gasket, said gasket locator contacting the radially inner peripheral edge of the gasket and free from contact with the radially outer peripheral edge of the gasket such that the gasket can deform radially outward from the gasket locator, the gasket locator extending axially away from a bottom surface of the base plate and axially abutting the end cap when the ring of filter media is installed within the cavity, the gasket locator and base plate forming a single continuous piece of material.

2. The filter cartridge as in claim 1, wherein said gasket locator is integrally formed into said base plate.

3. The filter cartridge as in claim 2, wherein said gasket locator is an annular wall molded into a bottom side of said base plate.

4. The filter cartridge as in claim 3, wherein said annular gasket is axially compressed between the end cap and the base plate, said gasket being axially thicker than the annular wall.

5. The filter cartridge of claim 1, wherein the base plate includes an outer rim and a central hub connected by a radially extending flange portion, the central hub projecting axially inwardly into a central opening of the end cap, wherein the gasket locator is disposed intermediate the central hub and the outer rim.

6. The filter cartridge of claim 5, wherein the gasket locator is an annular wall integrally formed on a bottom side of the flange portion.

7. The filter cartridge of claim 6, wherein the annular gasket is arranged radially outboard of the annular wall, wherein the inlet is arranged to inlet a higher pressure fluid to a region defined between the housing and an outside of the filter media, wherein the higher pressure fluid is adapted to undergo a pressure drop across the media and create a pressure differential across the gasket, wherein the annular wall is arranged to support the annular gasket against the higher pressure.

8. The filter cartridge of claim 7, wherein the rim is solid and free of holes, and wherein the inlet comprises a plurality of inlet holes formed in the flange portion.

9. The filter cartridge of claim 8, wherein the hub slidably and freely fits into the opening of the end cap freely without interference and without seals therebetween.

10. The filter cartridge of claim 9, wherein the base plate is a plastic member and wherein the rim defines a plurality of threads.

11. The filter cartridge as in claim 1, wherein said annular gasket is interposed between the inlet and the outlet preventing circumvention of the filter media between the end cap and said base plate.

12. A filter cartridge, comprising:
(a) a deep drawn metal canister having a first end and a second end, the second end being of a smaller diameter than the first end, the metal canister having a generally cylindrical sidewall between first and second ends includes a plurality of stepped regions;
(b) a baseplate formed of plastic material attached directly to the first end by deformation of the first end over the baseplate, the baseplate including a central hub and an outer rim connected by a radially extending flange portion, the hub and the outer rim extending in opposite axial directions from the flange portion, the baseplate further including:
(i) a plurality of inlet openings formed through the flange portion;
(ii) an annular seal support wall formed on a bottom side of the baseplate, the baseplate and annular seal support wall forming a single continuous piece of material;
(iii) a plurality of outlet openings defined by the hub; and
(iv) means for actuating a valve formed integrally with the hub;
(c) an internal filter element contained in the canister, the filter element including a cylindrical ring of filter media and top and bottom end caps sealingly bonded to opposing ends of the ring of filter media, the top end cap having an opening receiving the hub;
(d) a spring in the canister and supported by one of the stepped regions urging the filter element against the baseplate;
(e) a threaded ring secured by the second end of the canister, the threaded ring defining a drain port;
(f) a first outer gasket arranged on the outer rim;
(g) a second outer gasket arranged on the hub;
(h) an annular gasket arranged radially outboard of the annular wall, wherein the inlet openings are arranged to inlet a higher pressure fluid to a region defined between the housing and an outside of the filter media, wherein the higher pressure fluid is adapted to undergo a pressure drop across the filter media and create a pressure differential across the gasket, wherein the annular seal support wall is arranged to support the annular gasket against the higher pressure;
wherein the annular support wall is free of contact with a radially outer peripheral edge of the annular gasket, and wherein the annular support wall extends axially away from the bottom side of the baseplate such that the annular support wall axially abuts the top end cap when the internal element is installed in the canister.

13. The filter cartridge of claim 12, wherein said annular gasket is axially compressed between the end cap and the base plate, said gasket being axially thicker than the annular wall, and wherein the annular wall is sized to control the maximum amount of compression of the annular gasket and prevent overcompression of the annular gasket, the annular wall adapted to bottom out on the top end cap to prevent overcompression.

* * * * *